United States Patent [19]
Kouda et al.

[11] Patent Number: 4,939,654
[45] Date of Patent: Jul. 3, 1990

[54] FAIL-SAFE SYSTEM FOR VEHICULAR DRIVING CHARACTERISTICS CONTROL SYSTEM

[75] Inventors: Masanori Kouda; Tomoyoshi Sekiguchi; Yukio Ikeda; Minoru Taniguchi; Yasuhiro Shiraishi; Junkichi Konishi, all of Kanagawa, Japan

[73] Assignees: Nissan Motor Company, Limited, Yokohama; Atsugi Motor Parts Company, Limited, Atsugi, both of Japan

[21] Appl. No.: 203,856

[22] Filed: Jun. 8, 1988

[30] Foreign Application Priority Data

Jun. 12, 1987 [JP] Japan .............................. 62-90343[U]

[51] Int. Cl.$^5$ .............................................. B62D 5/00
[52] U.S. Cl. ................................ 364/424.05; 180/141; 180/142
[58] Field of Search ................... 364/424.01, 424.05; 180/141, 142, 79.1; 74/388 PS; 280/707

[56] References Cited

U.S. PATENT DOCUMENTS

| | | | |
|---|---|---|---|
| 4,526,401 | 7/1985 | Kakizaki et al. | 280/707 |
| 4,593,358 | 6/1986 | Takeshima et al. | 364/424.05 |
| 4,602,695 | 7/1986 | Takeshima et al. | 180/143 |
| 4,626,994 | 12/1986 | Yabe et al. | 364/424.05 |
| 4,666,013 | 5/1987 | Shibahata et al. | 180/141 |
| 4,718,685 | 1/1988 | Kawabe et al. | 280/91 |
| 4,794,536 | 12/1988 | Eto et al. | 364/424.05 |
| 4,803,629 | 2/1989 | Noto et al. | 364/424.05 |

FOREIGN PATENT DOCUMENTS 62-77210  4/1987  Japan .

Primary Examiner—Thomas G. Black
Attorney, Agent, or Firm—Foley & Lardner, Schwartz, Jeffery, Schwaab, Mack, Blumenthal & Evans

[57] ABSTRACT

A steering behavior dependent control system for controlling vehicular driving characteristics performs one or more control operations, such as anti-rolling suspension control, power assist control in a power steering system, rear wheel steering angle control in a four wheel steering system and so forth. The control system includes a steering angle sensor for monitoring steering angular displacement and produces a steering angle indicative signal. The control system is also provided a steering neutral position detector which detects steering at approximately a neutral position to produce an assumed steering neutral position indicative signal. A center value of a steering neutral range is projected on the basis of the steering angle indicative signal and the assumed steering neutral position indicative signal. Steering angle dependent control is thus performed by comparing the steering angle indicative signal value with the aforementioned center value to derive a magnitude of steering angular displacement. The control system further monitors an operating condition of the steering neutral position detector to detect a faulty condition thereof. When failure of the steering neutral position detector is detected, predetermined fail-safe operation takes place. In the fail-safe operation, the assumed center value of the steering neutral range is derived without utilizing the assumed steering neutral position indicative signal.

21 Claims, 6 Drawing Sheets

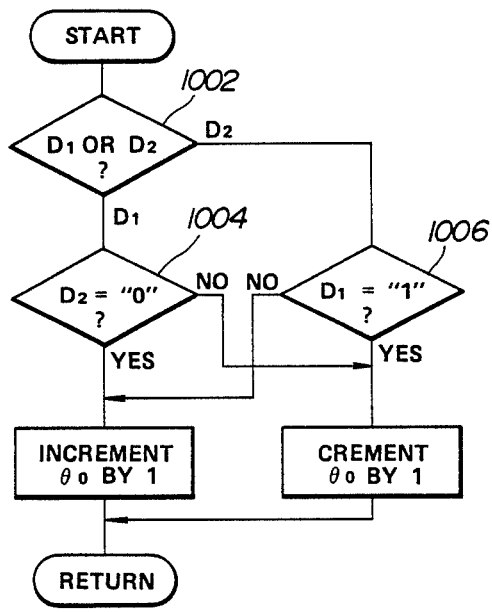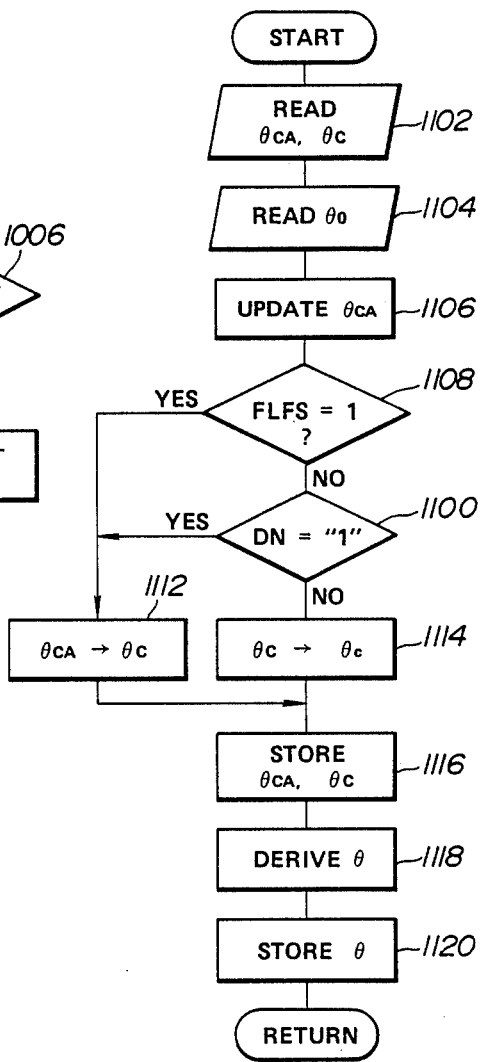

FAIL-SAFE SYSTEM FOR VEHICULAR DRIVING CHARACTERISTICS CONTROL SYSTEM

BACKGROUND OF THE INVENTION

1. Field of the Invention

The present invention relates generally to a vehicular driving characteristics control system, such as a suspension control system, a power steering control system, rear wheel steering angle control system in an four wheel steering system. More specifically, the invention relates to a vehicular driving characteristics control system which controls vehicular driving characteristics depending upon vehicular steering angular position. Further particularly, the invention relates to a fail-safe system for a vehicular driving characteristics control system which performs fail-safe operation in response to failure of steering angle sensor and/or a detector detecting steering neutral position.

2. Description of the Background Art

Japanese Patent First (unexamined) Publication (Tokkai) Showa 62-77210 discloses a vehicular steering angle monitoring system. The disclosed system includes means for monitoring vehicular steering behavior to generate a steering data. Based on the generated steering data, a steering neutral position indicative data is projected. The system is also provided with a steering neutral position sensor to detect steering angular position approximately at a predetermined neutral position to produce a neutral position signal. Based on the projected steering neutral position data and measured approximate neutral position, a center value of a steering neutral range is projected.

The steering angular displacement relative to the projected center value of the steering neutral range is monitored for performing control for controlling vehicular driving characteristics, such as anti-rolling suspension control, adjustment for power assist for a power steering system, adjustment of rear wheel steering angle in a four wheel steering system and so forth are performed.

In such conventional vehicular driving characteristics control system, means for detecting steering neutral position, such as steering neutral switch, is essential element. Therefore, when the steering neutral position detecting means fails, it becomes impossible to project the center value of the steering neutral range or to accurately project the center value. This causes in accuracy of detection of the steering angle displacement and thereby cause error in vehicular driving characteristics control.

SUMMARY OF THE INVENTION

Therefore, it is an object of the present invention to provide a fail-safe system which is detective of the steering neutral position detecting means and can perform fail-safe operation for enabling acceptably accurate vehicular driving characteristics control.

In order to accomplish the aforementioned and other objects, a steering behavior dependent control system for controlling vehicular driving characteristics, according to the invention, performs one or more control operations for vehicular driving factor, such as an anti-rolling suspension control, power assist control in a power steering system, a rear wheel steering angle control in a four wheel steering system and so forth. The control system includes a steering angle sensor for monitoring steering angular displacement and produces a steering angle indicative signal. The control system is also provided a steering neutral position detector means which detects the steering approximately at a neutral position to produce an assumed steering neutral position indicative signal. A central value of steering neutral range is projected on the basis of the steering angle indicative signal and the assumed steering neutral position indicative signal. Steering angle dependent control is thus performed by comparing the steering angle indicative signal value with the aforementioned center value to derive magnitude of steering angular displacement. The control system further monitors operating condition of the steering neutral position detector means for detecting faulty condition thereof. When failure of the steering neutral position detector means is detected, predetermined fail-safe operation will be taken place. In the fail-safe operation, the assumed center value of the steering neutral range is derived without utilizing the assumed steering neutral position indicative signal.

According to one aspect of the invention, a steering behavior dependent control system for controlling vehicular driving characteristics, comprises a first sensor means for monitoring steering angular displacement to produce a first sensor signal indicative thereof, a second sensor means for detecting steering at a predetermined neutral range to produce a second sensor signal, third means for projecting a reference angular position, in relation to which reference point, a magnitude of steering angular displacement is to be assured, on the basis of the first and second sensor signals, fourth means for deriving a magnitude of steering angular displacement on the basis of the first sensor signal and the reference angular position to generate a steering angle data, fifth means for deriving a control signal on the basis of the steering angle data for performing vehicular driving characteristics control for optimizing vehicle driving behavior, and sixth means for detecting failure of the second sensor for initiating fail-safe operation, in which steering angle data is projected irrespective of the second sensor signal.

According to another aspect of the invention, a system for angular displacement for generating a steering angular position data, comprises a first sensor means for monitoring steering angular displacement to produce a first sensor signal in a form of a pulse signal representative of given angle of angular displacement of the steering and steering direction, a second sensor means for detecting steering at a predetermined neutral range to produce a second sensor signal which is in a form of pulse signal variable of signal level between a first level while the steering angular position is within the neutral range and a second level while the steering angular position is out of the neutral range, third means for projecting a reference angular position, in relation to which a magnitude of steering angular displacement is to be measured, on the basis of the first and second sensor signals, fourth means for deriving a magnitude of steering angular displacement on the basis of the first sensor signal and the reference angular position to generate a steering angle data, and fifth means for detecting failure of the second sensor means for initiating fail-safe operation, in which steering angle data is projected irrespective of the second sensor signal level.

According to a further aspect of the invention, an anti-rolling automotive suspension control system for controlling vehicular suspension characteristics, comprises a vehicular suspension system disposed between a vehicular body and a suspension member rotatably supporting a road wheel, the suspension system being variable of suspension characteristics at least between a harder mode and a softer mode, an actuator associated with the suspension system and operating at least between a first position for operating the suspension system at the harder mode and a second position for operating the suspension system at the softer mode, a first sensor means for monitoring steering angular displacement to produce a first sensor signal in a form of a pulse signal representative of given angle of angular displacement of the steering and steering direction, a second sensor means for detecting steering at a predetermined neutral range to produce a second sensor signal which is in a form of pulse signal variable of signal level between a first level while the steering angular position is within the neutral range and a second level while the steering angular position is out of the neutral range, third means for projecting a reference angular position, in relation to which a magnitude of steering angular displacement is to be assured, on the basis of the first and second sensor signals, fourth means for deriving a magnitude of steering angular displacement on the basis of the first sensor signal and the reference angular position to generate a steering angle data, fifth means for deriving a suspension control signal on the basis of the steering angle data for controlling the actuator between the first and second mode for suppressing vehicular rolling for optimization of vehicle driving behavior, and sixth means for detecting failure of the second sensor for initiating fail-safe operation, in which steering angle data is projected irrespective of the second sensor signal.

The third means may be periodically activated for deriving a running average based on first sensor signal value and the reference angular position data derived in a immediately preceding cycle, as the reference angular position data while the second sensor means operates in normal condition.

The sixth means operates the third means in a fail-safe mode, in which the third means set the reference angular position data derived in immediately preceding cycle as the reference angular position data. The sixth means monitors the second sensor signal level and actual steering behavior based on the first sensor signal in order to detect faulty condition of the second sensor means. The sixth means detects faulty condition of the second sensor means when the second sensor signal is held at the second level representative of steering angular position out of the neutral range through 360° of actual steering angular displacement, when the second sensor signal is held at the second level representative of steering angular position out of the neutral range during a predetermined distance of vehicular travel, or when the second sensor signal is held at the first level representative of steering angular position out of the neutral range through a predetermined angle of actual steering angular displacement, which predetermined angle is greater than an angular range of the neutral range.

BRIEF DESCRIPTION OF THE DRAWINGS

In the drawings:

FIG. 6 is a flowchart showing an steering pulse processing interrupt routine for processing steering angle pulses of FIG. 5 for deriving a steering angular displacement direction and magnitude indicative data;

FIG. 7 is a flowchart showing a steering angular position deriving interrupt routine for processing the steering angular displacement direction and magnitude indicative data for deriving a steering angular position relative to a steering neutral position;

DESCRIPTION OF THE PREFERRED EMBODIMENT

Figure 1:
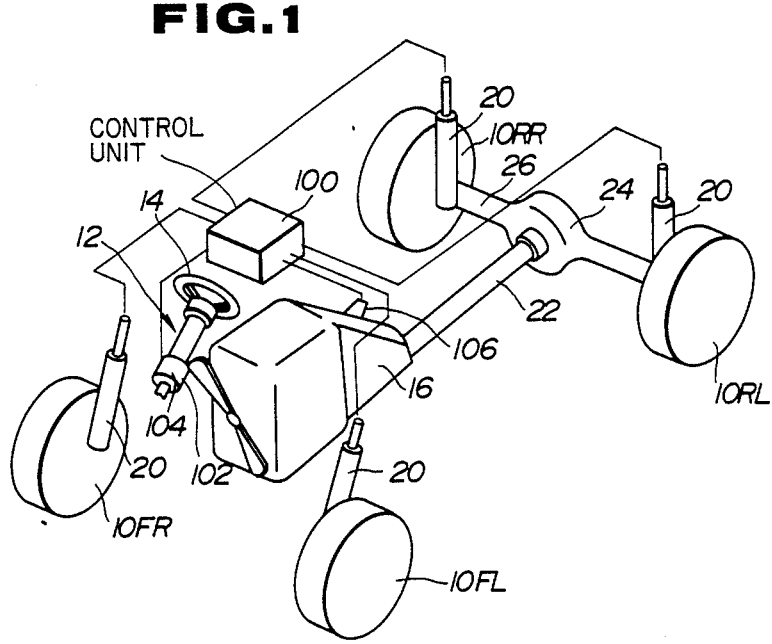
FIG. 1 is a frangmental and explanatory perspective illustration showing a vehicular suspension control system as one example of a vehicular driving characteristics control system, to which the preferred embodiment of a steering behavior dependent control system, according to the present invention is applicable.

Referring now to the drawings, particularly to FIG. 1, there is fragmentarily shown a vehicular suspension system, to which the preferred embodiment of a steering behavior dependent control system is applicable. The suspension system with steering behavior dependent anti-rolling control discussed hereinbelow should be appreciated as mere example of application of the preferred embodiment of steering behavior dependent control, according to the invention. Namely, the preferred embodiment of the steering behavior control system will be applicable for any control activities taking the steering angle position as one of control parameters.

As seen from FIG. 1, the suspension system includes suspension assemblies interposed between a vehicle body (not shown) and front-left, front-right, rear-left and rear-right road wheels 10FL, 10FL, 10RL and 10RR. Each suspension assemblies includes shock absorber 20 which is variable of damping characteristics. Each of the variable damping characteristics shock absorber 20 is connected to a control unit 100 to receive therefrom an anti-rolling suspension control signal to be controlled the operation mode.

Figure 2:
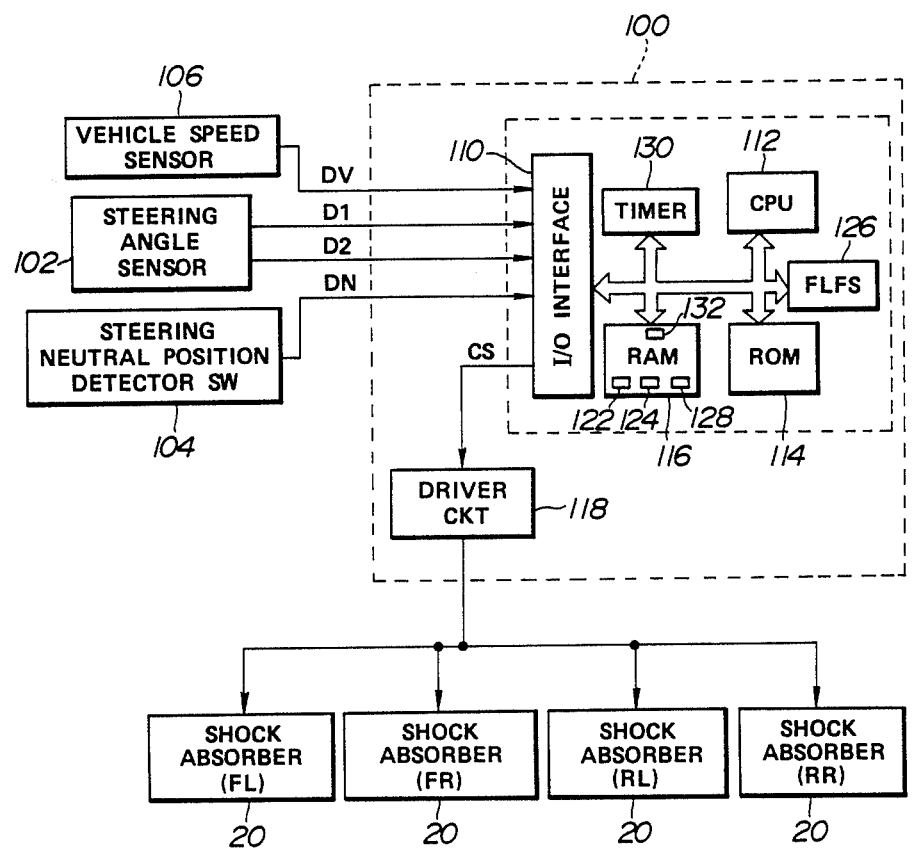
FIG. 2 is a block diagram of the preferred embodiment of the steering behavior dependent control system employed in the suspension control system of FIG. 1.

As shown in FIGS. 1 and 2, the control unit 100 is also connected to a steering angle sensor 102 and a steering neutral position detector switch 104 which are associated with a vehicular steering mechanism 12 including a steering wheel 14. The control unit 100 is further connected to a vehicle speed sensor 106. In the shown embodiment, the vehicle speed sensor 106 associated with a power transmission 16 transferring a driving torque generated by an automotive engine 18 to driven wheels 10RL and 10RR via a propeller shaft 22, a differential gear box 24 and drive shafts 26. As will be appreciated, though the shown embodiment employs the vehicle speed sensor 106 associated with the power transmission 16, it may possible to monitor the vehicular speed by monitoring rotation speed of the propeller shaft 22. The vehicle speed sensor 106 may comprise an electromagnetic sensor, an optical sensor or any other appropriate sensors. The vehicle speed sensor 106 employed in the shown embodiment is designed to produce a vehicle speed indicative pulse every one cycle of rotation of the output shaft of the power transmission 16.

Figure 3:
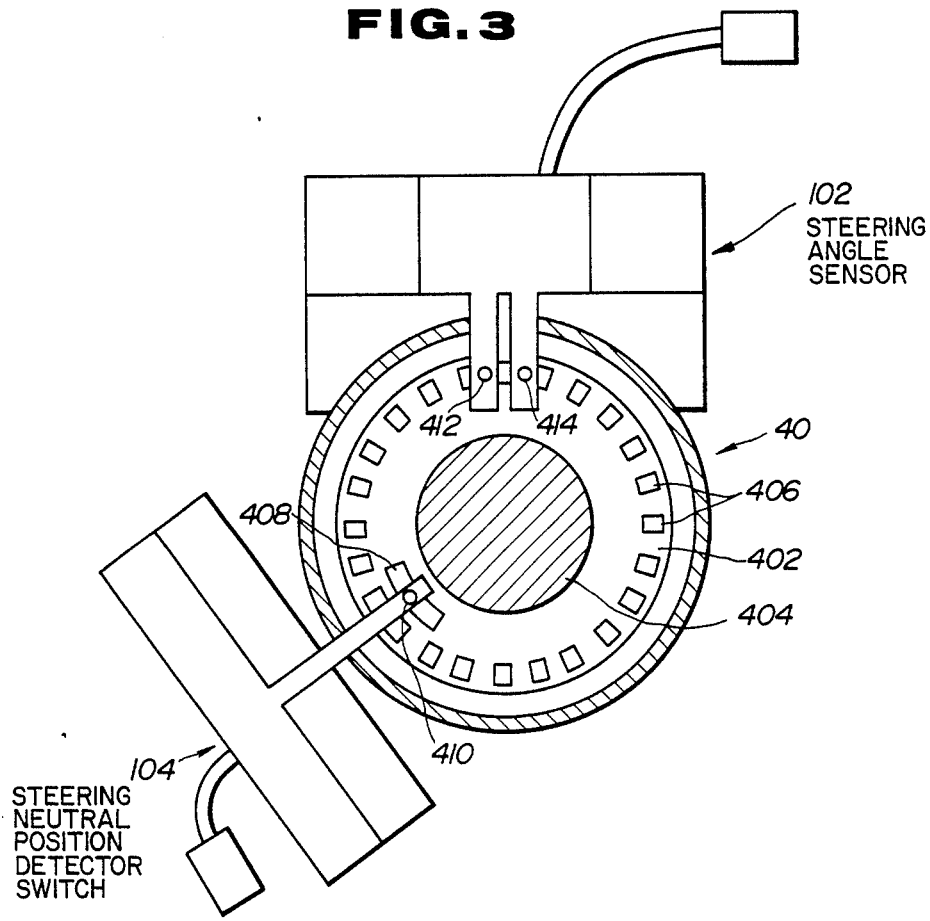
FIG. 3 is an illustration of the steering angular position monitoring assembly employing a steering angle sensor and a steering neutral position detector, which steering angle monitoring assembly is employed in the steering behavior dependent control system of FIG. 2.

As shown in FIG. 3, the steering sensor assembly 40 comprises a rotary disc 402 rigidly fixed to a steering column shaft 404 for rotation therewith. The rotary disc 402 is formed with a plurality of circumferentially arranged slits 406. These slits 406 are oriented in circumferentially spaced apart relationship to each other with a given regular intervals. The rotary disc 402 is also formed with an arc-shaped and circumferentially elongated slit 408. Optical sensors such as photo-interrupter, which serves as the steering neutral position switch 104 and the steering angle sensor 102 are provided in opposition to the rotary disc 402. The steering neutral position switch 104 comprises a light emitting element 410 and a photo receiving element (not shown) to constitute the photo-interrupter. The light emitting element 410 is arranged so as to oppose to the arc-shaped slit 408 when the steering is held at neutral position. As will be appreciated, the circumferential length of the arc shaped slit 408 is determined in view of the play of the steering column shaft 404 in the neutral position. With this construction, the steering neutral position sensor 104 outputs the steering neutral position indicative signal $S\theta_0$ while the light emitting element 410 opposes the arc-shaped slit 408.

On the other hand, the steering angle sensor 102 comprises a pair of photo sensors 412 and 414. Each of the photo sensors 412 and 414 comprises a photo emitting element and a photo receiving element arranged in alignment across the rotary disc 402. These photo sensors 412 and 414 are radially arranged to oppose the slits 406 to detect the slit positions. The photo sensors 412 and 414 are arranged in circumferentially spaned relationship. The distance between the photo sensors 412 and 414 corresponds one-fourth of pitch P of the adjacent slits 406 or multiple of the one-fourth of the pitch. This arrangement of the pair of the photo sensors 412 and 414 causes phase difference of pulse signals produced by the photo receiving elements thereof in response to the light emitted to the associated light emitting elements. The waveform of the pulses produced by the photo receiving elements of the photo sensors 412 and 414 are shown in FIG. 3. Assuming the span of the photo sensors 412 and 414 is one-fourth of the pitch P, the pulse signal $D_1$ produced by the photo sensor 412 and the pulse signal $D_2$ produced by the photo sensor 414 have phase shift of one-fourth of the pitch. In the shown layout of the photo sensors 412 and 414, the photo sensor 412 resides the leading side and the photo sensor 414 resides the following side when steering angular displacement occurs in left-hand steering direction. On the other hand, upon right-hand steering, the photo sensor 414 resides the leading side and the photo sensor 412 resides the following side. As will be appreciated, depending upon the steering direction, phase shift between the two pulse signals $D_1$ and $D_2$ varies. Namely, in left hand steering, the leading edge of the pulse signal $D_1$ appears in advance of the leading edge of the pulse signal $D_2$, and in right-hand steering, the leading edge of the pulse signal $D_2$ appears in advance of the leading edge of the pulse signal $D_1$. Therefore, by monitoring the phase shift, steering direction can be detected.

On the other hand, since the slits 406 is arranged with a regular circumferential intervals, magnitude of angular displacement can be measured by counting number of pulse signals produced by one of the photo sensors 412 and 414.

Figure 5:
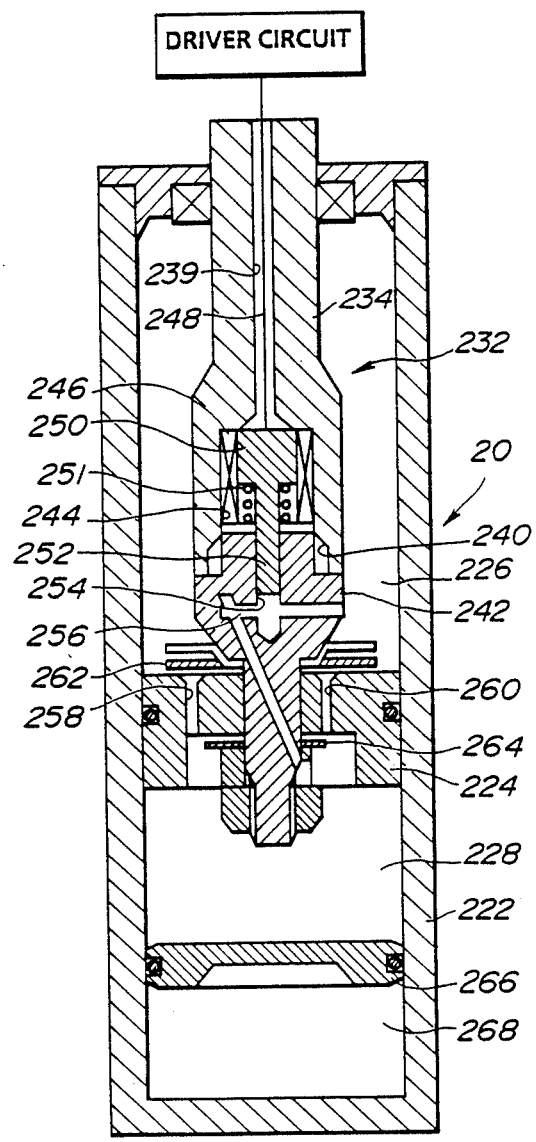
FIG. 5 is a sectional view of a variable damping force shock absorber employed in the suspension control system of FIG. 1.

FIG. 5 shows the preferred construction of the shock absorber 20 which can vary damping characteristics. As will be appreciated, the shown construction of the shock absorber 20 is variable of the damping characteristics between HARD suspension mode position and SOFT suspension mode position. Though the shown embodiment employs 2-way variable shock absorber, it may possible to employ 3-way variable shock absorber variable of the suspension mode between HARD suspension mode, MEDIUM suspension mode and SOFT suspension mode. Such 3-way variable shock absorber has been disclosed in the U.S. Pat. No. 4,526,401, for example. The disclosure of the aforementioned U.S. Patent is herein incorporated by reference for the sake of disclosure. Furthermore, any type of the shock absorbers which is variable of damping or suspension characteristics can be employed in the shown embodiment, as long as it can be electrically, electromechanically, hydraulically controlled in automatic fashion by the control signal from the control unit 50.

FIG. 5 shows the detailed structure of a variable-damping-force shock absorber 212 employed in the shown embodiment of the suspension control system according to the present invention. The shock absorber 212 generally comprises a hollow cylinder 220 and a piston 224 fitting flush within the hollow interior of the cylinder 220. The piston 224 defines upper and lower fluid chambers 226 and 228 within the cylinder 220. The cylinder 220 also receives a free piston 266 which defines a pneumatic chamber 268 below the lower fluid chamber 228.

The piston 224 is connected to the vehicle body (not shown) by means of a piston road which is generally referred to by the reference number 232. The piston rod 232 comprises upper and lower segments 234 and 236. The upper segment 234 is formed with an axially extending through opening 238. The lower end of the through opening 238 opens into a recess 240 defined on the lower end of the upper segment 234. On the other hand, the lower segment 236 has an upper section 242 engageable to the recess 40 to define therein a hollow space 44. An actuator is disposed within the space 244. The actuator 246 is connected to a driver circuit which will be discussed later, through a lead 248 extending through the through opening 238. The actuator 246 is associated with a movable valve body 250 which has a lower end extension 252 inserted into a guide opening 254 defined in the lower segment 236. The guide opening 254 extends across a fluid passage 256 defined through the lower segment 236 for fluid communication between the upper and lower fluid chambers 226 and 228.

The fluid passage 256 serves as a by-pass for flow-restrictive fluid passages 258 and 260 formed in the piston 224. The upper end of the fluid passage 258 is closed by a resilient flow-restricting valve 262. Similarly, the lower end of the fluid passage 260 is closed by a flow restricting valve 264. The flow-restricting valves 262 and 264 serve as check valves for establishing one-way fluid communication in opposite directions. In addition, since the flow-restriction valves 262 and 264 are biased toward the ends of the fluid passages 258 and 260, they open to allow fluid communication between the upper and lower fluid chambers 226 and 228 only when the fluid pressure difference between the upper and lower chambers 226 and 228 overcomes the effective pressure of the valves.

The cross-sectional area of the fluid passages 258 and 260 and the set pressures of the fluid-restriction valves 260 and 262 determine the damping force produced in HIGH damping force mode. The cross-sectional area of the fluid passage 256 determines the drop in the damping force in the LOW damping force mode in comparison with that in the HIGH damping force mode.

The movable valve body 250 is normally biased upwards by means of a coil spring 251. As a result, when the actuator 246 is not energized, the lower end section 252 of the valve body 250 is separated from the fluid passage 256 to allow fluid communication between the upper and lower chamber. When the actuator 246 is energized, the valve body 250 moves downwards against the resilient force of the coil spring 251 to block the fluid passage 256 with the lower end extension 252. As a result, fluid communication between the upper and lower fluid chambers 226 and 228 via the fluid passage 256 is blocked. When fluid communication through the fluid passage is permitted, the damping force produced by the shock absorber 20 remains LOW. On the other hand, when the fluid passage 256 is shut, fluid flow rate is reduced, thus increasing the damping force produced. Therefore, when the valve body 250 is shifted to the lowered position, he shock absorber works in HIGH damping force mode to produce a higher damping force against vertical shocks.

In the normal state wherein the control signal of the control unit 100 remains LOW, the movable valve body 250 is held in its upper position by the effect of the spring force 251 so that the lower end extension 252 does not project into the fluid passage 256. Therefore, the fluid communication is established through both the fluid passage 256 and the applicable one of the flow-restricting fluid passages 258 and 260. As a result, the total flow restriction is relatively weak to allow the shock absorber to operate in SOFT mode.

In response to a HIGH-level control signal from the control unit 100, the shock absorber 20 is operated to energize the actuator 246. The actuator 246 drives the movable valve body 250 downward. This downward movement shifts the lower end of the extension 252 of the valve body 250 into the fluid passage 256 so as to block fluid communication between the upper and lower fluid chambers 226 and 228 via the fluid passage 256. Therefore, the fluid can flow between the upper and lower chambers 226 and 228 only through one of the fluid passages 258 and 260. The fluid flow restriction is, thus, increased, resulting in a greater damping force than is produced in the SOFT mode. In other words, the shock absorber 20 operates in HARD mode.

Returning to FIG. 2, the control unit 100 comprises a microprocessor including an input/output interface 110, CPU 112, ROM 114 and RAM 116. The input/output interface 110 is connected to a driver circuit 118 which is connected to actuators 246 of the variable damping characteristics shock absorber 20.

It should be appreciated that though the shown embodiment employs single driver circuit 118 for controlling the shock absorber between the SOFT mode and HARD mode, it may be possible to provide mutually independent driver circuits for respective actuators 246 for controlling damping characteristics of the shock absorbers independently of each other. Such type of suspension control will be advantageously employed so as to perform better suspension control performance for regulating vehicular attitude and providing driving stability.

The control unit 100 performs anti-rolling suspension control system by executing the routines illustrated in FIGS. 6 to 11.

FIG. 6 shows an interrupt routine for processing steering angle pulses $D_1$ and $D_2$ produced by the steering angle sensor 102. The shown routine is triggered by leading edge of HIGH level steering angle pulse $D_1$ or $D_2$. As set forth, with the construction of the steering angle sensor 102 shown in FIG. 3, the direction of steering angular displacement can be appreciated by monitoring phase difference of the steering angle. Therefore, immediately after starting execution of the routine of FIG. 6, the check is performed which steering pulses $D_1$ and $D_2$ triggers the routine, at a step 1002. If the triggering steering pulse is $D_1$, the level of the steering angle pulse $D_2$ is checked at the step 1004 whether the level of the steering angle pulse $D_2$ is HIGH or not. On the other hand, if the triggering pulse is $D_2$, the level of the steering angle pulse $D_2$ is checked at the step 1006 whether the level of the steering angle pulse $D_1$ is HIGH or not.

Figure 4:
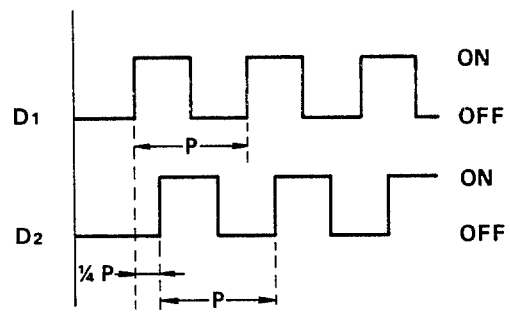
FIG. 4 is a timing chart showing steering angle pulses produced by a pair of optical sensors constituting the steering angle sensor in the steering angular position monitoring assembly of FIG. 3.

As will be observed from FIG. 4, the relationship between the signal levels of the steering angle pulses $D_1$ and $D_2$ and the steering directions can be illustrated in the following table:

| Trigger Pulse | $D_1$ | $D_2$ | Steering Direction |
| --- | --- | --- | --- |
| $D_1$ | H | H | LEFT |
| $D_1$ | H | L | RIGHT |
| $D_2$ | H | H | RIGHT |
| $D_2$ | L | H | LEFT |

In the shown embodiment, a steering angle counter value $\theta_0$ of a steering angle counter 120 in RAM 116 is increased according to increasing of right-hand steering magnitude and is decreased according increasing of left-hand steering magnitude. When the steering pulse $D_1$ is the trigger pulse as checked at the step 1002 and when the level of the steering angle pulse $D_2$ is HIGH as checked at the step 1004, judgement is made that right-hand steering operation is made. Therefore, the steering angle counter value $\theta_0$ is incremented by 1, at a step 1008. On the other hand, when the steering angle pulse $D_2$ is the trigger pulse as checked at the step 1002 and when the steering angle pulse $D_1$ is HIGH level as checked at the step 1006, judgement is made that left-hand steering operation is made. In this case, the steering angle counter value $\theta_0$ is decremented by 1, at a step 1010.

On the other hand, when the level of steering angle pulse $D_2$ is LOW as checked at the step 1004, process goes to the step 1008 to increment the steering counter value $\theta_0$ by 1. On the other hand, when the level of the steering angle pulse $D_1$ as checked at the step 1006 is LOW, process goes to step 1010 to decrement by 1.

After one of the steps 1008 or 1010, process returns to a main routine as the background job.

FIG. 7 shows a routine for deriving steering magnitude indicative data $\theta$ representative of left- or right-hand steering magnitude relative to a steering neutral position. The routine of FIG. 7 is triggered every given distance of vehicle travel. In the shown embodiment, the vehicular travelling distance is monitored by counting the vehicle speed indicative pulse generated by the vehicle speed sensor 106.

Immediately after triggering the routine, a projected steering neutral position data $\theta_{CA}$ and an assumed center position data $\theta_C$ of the steering neutral position range set in memory blocks 122 and 124 of RAM 106 are read out at a step 1102. The steering angle counter value $\theta_0$ is then read out at a step 1104. Based on the projected steering neutral position data $\theta_{CA}$, an assumed center position data $\theta_C$ and the steering angle counter value $\theta_0$, the projected steering neutral position data $\theta_{CA}$ is updated at a step 1106. In practice, the projected steering neutral position data $\theta_{CA}$ is derived as running average value obtained from the following equation:

$$\theta_{CA} = \theta_{CA}(\text{OLD}) - \theta_C/100 + \theta_0/100$$

where $\theta_{CA}$ is the value read at the step 1102.

Thereafter, a fail-safe condition indicative flag FLFS which is to be set in a flag register 126 is checked at a step 1108. When the fail-safe condition indicative flag FLFS is not set as checked at the step 1108, the input from the steering neutral position detector switch 104 is checked at a step 1110.

When the signal level from the steering neutral position detector switch 104 is LOW as checked at the step 1110, the read center position indicative value $\theta_C$ is set as the center position indicative data $\theta_C$ at a step 1112. On the other hand, when the fail-safe condition indicative flag FLFS is set as checked at the step 1108 or when the steering neutral angle position indicative signal DN of the steering neutral position detector switch 104 is HIGH as checked at the step 1110, the projected steering neutral position data $\theta_{CA}$ derived at the step 1106 is set as the center position data $\theta_C$ of the steering neutral range, at a step 1114.

After one of the steps 1112 and 1114, the projected steering neutral position data $\theta_{CA}$ and the center position data $\theta_C$ of the steering neutral range are stored in the memory blocks 122 and 124 to update the values set in the former execution cycle, at a step 1116. Then, at a step 1120, the steering angular position relative to the steering neutral position represented by the center value $\theta_C$ is derived by subtracting the center value $\theta_C$ from the steering angle counter value $\theta_0$, at a step 1122. The steering angular position data $\theta$ thus derived at the step 1122 is set in a memory block 128, at a step 1124.

Figure 8:
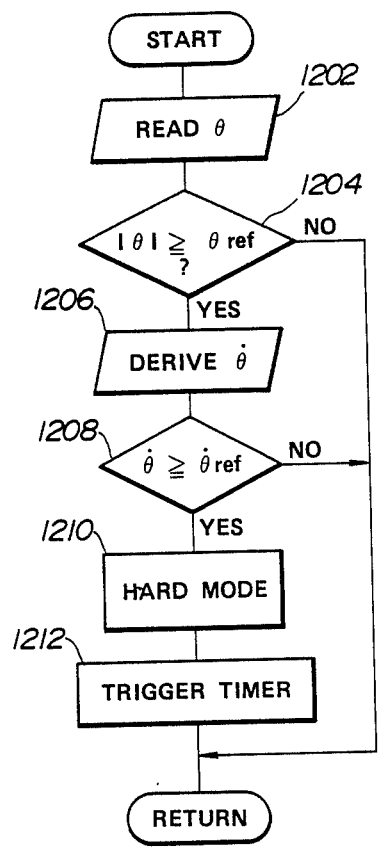
FIG. 8 is a flowchart of an anti-rolling suspension control routine for deriving a suspension control signal for controlling the operation mode of the shock absorber of FIG. 5 on the basis of the steering angular position indicative data derived through execution of the routine of FIG. 7.

FIG. 8 shows a routine for performing anti-rolling suspension control. The shown routine is designed to be triggered with a given regular time intervals, e.g. 50 ms.

Immediately after starting execution, the steering angle position data $\theta$ is read at a step 1202. Absolute value of the steering angle position data $|\theta|$ is compared with a predetermined vehicular rolling threshold $\theta_{ref}$ at a step 1204. When the steering angle position data $|\theta|$ is greater than or equal to the vehicular rolling thresholds $\theta_{ref}$, a steering velocity $\dot{\theta}$ is derived at a step 1206. In practice, the steering velocity $\dot{\theta}$ is derived by obtaining variation magnitude of the steering angular position within 100 ms.

The steering velocity $\dot{\theta}$ derived at the step 1206 is compared with a steering velocity threshold $\dot{\theta}_{ref}$, at a step 1208. When the steering velocity $\dot{\theta}$ as checked at the step 1208 is greater than or equal to the steering velocity threshold $\dot{\theta}_{ref}$, the anti-rolling suspension control signal ordering HARD mode of the shock absorber 20 is output at a step 1210. Then, a timer 130 in the control unit 100 is triggered to measure an elapsed time, at a step 1212. After the step 1212 process returns to the main program.

On the other hand, when the absolute value $|\theta|$ of the steering angle counter data $\theta$ is smaller than the vehicular rolling threshold $\theta_{ref}$ as checked at the step 1204, or when the steering velocity $\dot{\theta}$ is smaller than the steering velocity threshold $\dot{\theta}_{ref}$ as checked at the step 1208, process goes END to return the main program.

Figure 9:
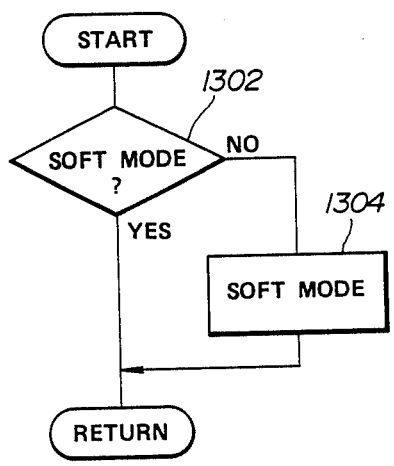
FIG. 9 is a flowchart of a timer triggered interrupt routine which is triggered upon expiration of a given period of time for controlling the operation mode of the shock absorber of FIG. 5 at a SOFT mode position.

When the timer value of the timer 130 triggered at the step 1212 becomes longer than a predetermined time, a routine of FIG. 9 is triggered. Immediately after starting the routine of FIG. 9, shock absorber mode is checked at a step 1302. If the shock absorber in SOFT mode is detected as checked at the step 1302, process immediately goes END to return the main program. On the other hand, when the shock absorber operation mode as checked at the step 1302 is HARD mode, the suspension control signal ordering SOFT mode is output at a step 1304. After the step 1304, process returns to the main program.

Figure 10:
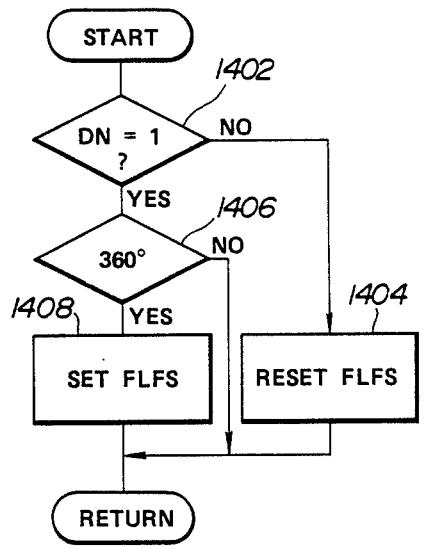
FIG. 10 is a flowchart of a fail-safe routine to be performed by the preferred embodiment of the steering behavior dependent control system of FIG. 2.

FIG. 10 is a routine for checking steering neutral position detector switch and for triggering fail-safe operation when failure of the steering neutral position detector switch is detected.

In the process of FIG. 10, the steering neutral position detector switch position is checked at a step 1402. If ON position of the steering neutral position detector switch 104 is detected as checked at the step 1402, the fail-safe condition indicative flag FLFS is reset at a step 1404.

On the other hand, when the steering neutral position detector switch 104 is in OFF position, steering angle counter $\theta_0$ is checked whether the steering angle counter value $\theta_0$ represents steering angular displacement greater than or equal to 360° at a step 1406. If the steering angle counter value is smaller than 360°, process directly goes to the main program. On the other hand, when the steering angle counter value is greater than or equal to 360°, the fail-safe condition indicative flag FLFS is set at a step 1408.

Figure 11:
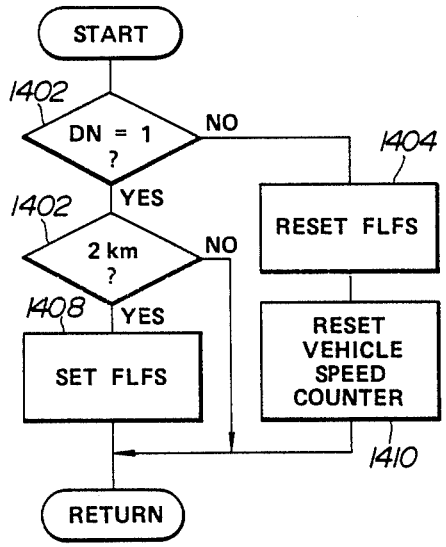
FIG. 11 is a flowchart of another embodiment of a fail-safe routine to be performed by the preferred embodiment of the steering behavior dependent control system of FIG. 2.

In the alternative embodiment shown in FIG. 11, the step 1406 set forth above is modified to check the vehicle driving distance. Namely, at a modified step 1406', the vehicle driving distance is compared with a given distance, e.g. 2 km. In order to enable this, a vehicle speed counter 132 is provided in the control unit 100, which vehicle speed counter 132 is reset when the steering neutral position detector switch 104 is ON, at an additional step 1410 which is performed following to the step 1404.

As will be appreciated, the shown embodiment enables approximately accurate anti-rolling suspension control system even when the steering neutral condition detector switch fails.

Though the shown embodiment detects failure of the steering neutral condition detector switch by detecting the switch position maintained OFF even when the steering operation as monitored through the steering angle sensor, necessarily displacing across the possible neutral position, is performed, it is also possible to detect failure of the steering neutral condition detector switch by detecting the switch position held ON while the steering is operated over a given magnitude which is large enough to cause turning OFF of the switch.

Furthermore, though the shown embodiment is concentrated to the anti-rolling suspension control system, the process of monitoring steering angular displacement in relation to the projected steering neutral position and the fail-safe operation when the steering neutral condition detector switch fails are applicable for other control systems such as for adjustment of power assist in a power steering system, and adjustment of a rear wheel steering magnitude in a four wheel steering system. Furthermore, such system may be applicable for anti-skid brake control system which adjust braking pressure at vehicular cornering states.

What is claimed is:

1. A steering behavior dependent control system for controlling vehicular driving characteristics, comprising:
   a first sensor means for monitoring steering angular displacement to produce a first sensor signal indicative thereof;
   a second sensor means for detecting steering in a predetermined neutral range to produce a second sensor signal indicative of steering in said predetermined neutral range;
   third means for generating a reference angular position, wherein in relation to a reference point, a magnitude of steering angular displacement is to be controlled in accordance with said first and second sensor signals;
   fourth means for deriving a magnitude of steering angular displacement in accordance with said first sensor signal and said reference angularly position to generate steering angle data;
   fifth means for deriving a control signal in accordance with said steering angle data for performing vehicular driving characteristics control for optimizing vehicle driving behavior; and
   sixth means for detecting failure of said second sensor and for initiating fail-safe operation in which steering angle data is generated irrespective of said second sensor signal.

2. A steering behavior dependent control system as set forth in claim 1, wherein said third means is periodically activated for deriving a running average based on a first sensor signal value and reference angular position data derived in an immediately preceding cycle, as reference angular position data while said second sensor means operates in a normal condition.

3. A steering behavior dependent control system as set forth in claim 2, wherein said sixth means operates said third means in a fail-safe mode, in which said third means set said reference angular position data derived in immediately preceding cycle as said reference angular position data.

4. A steering behavior dependent control system as set forth in claim 1, wherein said sixth means monitors said second sensor signal level and actual steering behavior based on said first sensor signal in order to detect faulty condition of said second sensor means.

5. A steering behavior dependent control system as set forth in claim 4, wherein said sixth means detects faulty condition of said second sensor means when said second sensor signal is held at a level representative of steering angular position out of said neutral range through 360° of actual steering angular displacement.

6. A steering behavior dependent control system as set forth in claim 4, wherein said sixth means detects faulty condition of said second sensor means when said second sensor signal is held at a level representative of steering angular position out of said neutral range during a predetermined distance of vehicular travel.

7. A steering behavior dependent control system as set forth in claim 4, wherein said sixth means detects faulty condition of said second sensor means when said second sensor signal is held at a level representative of steering angular position out of said neutral range through a predetermined angle of actual steering angular displacement, which predetermined angle is greater than an angular range of said neutral range.

8. A system for generating steering angular position data, said system comprising:
   a first sensor means for monitoring steering angular displacement to produce a first sensor signal in a form of a pulse signal representative of a given angle of angular displacement of steering and steering direction;
   a second sensor means for detecting steering in a predetermined neutral range to produce a second sensor signal which is in a form of a pulse signal varying between a first level while steering angular position is within said neutral range and a second level while steering angular position is outside of said neutral range;
   third means for generating a reference angular position, in relation to which a magnitude of steering angular displacement is to be measured, in accordance with said first and second sensor signals;
   fourth means for deriving a magnitude of steering angular displacement in accordance with said first sensor signal and said reference angular position to generate steering angle data; and
   fifth means for detecting failure of said second sensor means and for initiating fail-safe operation in which steering angle data is generated irrespective of said second sensor signal level.

9. A system as set forth in claim 8, wherein said third means is periodically activated for deriving a running average based on a first sensor signal value and reference angle position data derived in an immediately preceding cycle, as reference angular position data while said second sensor means operates in a normal condition.

10. A system as set forth in claim 9, wherein said fifth means operates said third means in a fail-safe mode, in which said third means set said reference angular position data derived in immediately preceding cycle as said reference angular position data.

11. A system as set forth in claim 10, wherein said fifth means monitors said second sensor signal level and actual steering behavior based on said first sensor signal in order to detect faulty condition of said second sensor means.

12. A system as set forth in claim 11, wherein said fifth means detects faulty condition of said second sensor means when said second sensor signal is held at said second level representative of steering angular position out of said neutral range through 360° of actual steering angular displacement.

13. A system as set forth in claim 11, wherein said fifth means detects faulty condition of said second sensor means when said second sensor signal is held at said second level representative of steering angular position out of said neutral range during a predetermined distance of vehicular travel.

14. A system as set forth in claim 11, wherein said fifth means detects faulty condition of said second sensor means when said second sensor signal is held at said first level representative of steering angular position out of said neutral range through a predetermined angle of actual steering angular displacement, which predetermined angle is greater than an angular range of said neutral range.

15. An anti-rolling automotive suspension control system for controlling vehicular suspension characteristics, said control system comprising:
a vehicular suspension system disposed between a vehicular body and a suspension member rotatably supporting a road wheel, said suspension system having variable suspension characteristics at least between a harder mode and a softer mode;
an actuator associated with said suspension system and operating at least between a first position for operating said suspension system at said harder mode and a second position for operating said suspension system at said softer mode;
a first sensor means for monitoring steering angular displacement to produce a first sensor signal in a form of a pulse signal representative of a given angle of angular displacement of steering and steering direction;
a second sensor means for detecting steering in a predetermined neutral range to produce a second sensor signal which is in a form of a pulse signal varying between a first level while steering angular position is within said neutral range and a second level while steering angular position is outside of said neutral range;
third means for generating a reference angular position, in relation to which a magnitude of steering angular displacement is to be controlled in accordance with said first and second sensor signals;
fourth means for deriving a magnitude of steering angular displacement in accordance with said first sensor signal and said reference angular position to generate steering angle data;
fifth means for deriving a suspension control signal in accordance with said steering angle data for controlling said actuator between said softer and said harder modes for suppressing vehicular rolling for optimization of vehicle driving behavior; and
sixth means for detecting failure of said second sensor means and for initiating fail-safe operation in which steering angle data is generated irrespective of said second sensor signal.

16. A suspension control system as set forth in claim 15, wherein said third means is periodically activated for deriving a running average based on a first sensor signal value and reference angular position data derived in an immediately preceding cycle, as reference angular position data while said second sensor means operates in a normal condition.

17. A suspension control system as set forth in claim 16, wherein said sixth means operates said third means in a fail-safe mode, in which said third means set said reference angular position data derived in immediately preceding cycle as said reference angular position data.

18. A suspension control system as set forth in claim 15, wherein said sixth means monitors said second sensor signal level and actual steering behavior based on said first sensor signal in order to detect faulty condition of said second sensor means.

19. A suspension control system as set forth in claim 18, wherein said sixth means detects faulty condition of said second sensor means when said second sensor signal is held at said second level representative of steering angular position out of said neutral range through 360° of actual steering angular displacement.

20. A suspension control system as set forth in claim 18, wherein said sixth means detects faulty condition of said second sensor means when said second sensor signal is held at said second level representative of steering angular position out of said neutral range during a predetermined distance of vehicular travel.

21. A suspension control system as set forth in claim 18, wherein said sixth means detects faulty condition of said second sensor means when said second sensor signal is held at said first level representative of steering angular position out of said neutral range through a predetermined angle of actual steering angular displacement, which predetermined angle is greater than an angular range of said neutral range.

* * * * *